No. 760,006. PATENTED MAY 17, 1904.
J. MAES.
PERCH FOR FOWLS.
APPLICATION FILED NOV. 9, 1903.
NO MODEL.
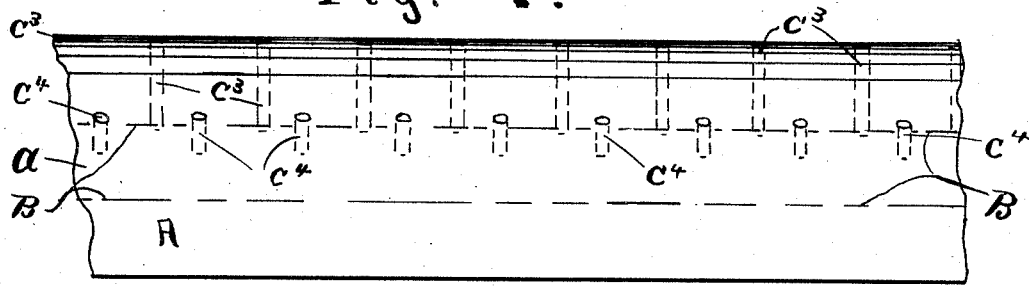
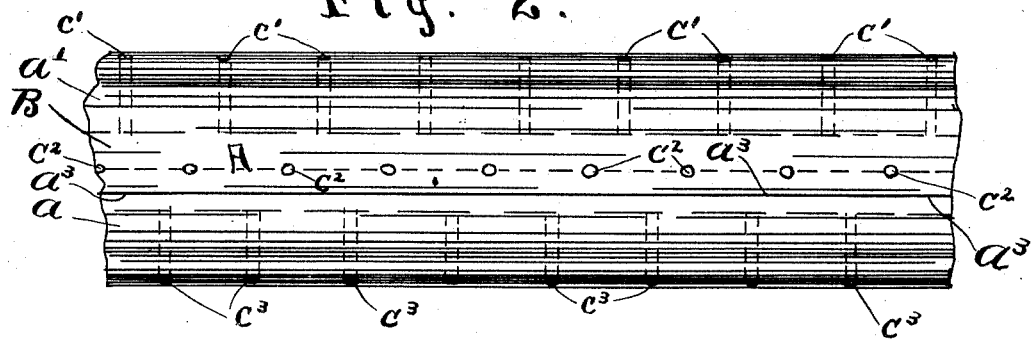
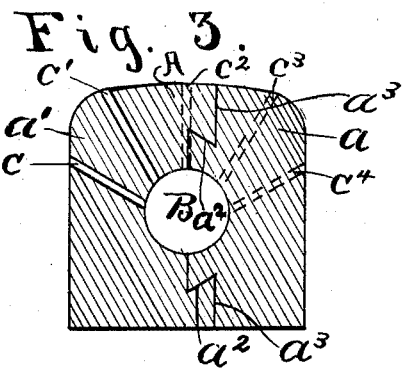
WITNESSES:
C. A. Adams.
Johnstone M. Calmont
INVENTOR
John Maes,
BY
Charles Turner Brown,
ATTORNEY No. 760,006. Patented May 17, 1904.

UNITED STATES PATENT OFFICE.

JOHN MAES, OF CHICAGO, ILLINOIS, ASSIGNOR OF ONE-HALF TO JOHNSTONE McCALMONT, OF CHICAGO, ILLINOIS.

PERCH FOR FOWLS.

SPECIFICATION forming part of Letters Patent No. 760,006, dated May 17, 1904.

Application filed November 9, 1903. Serial No. 180,457. (No model.)

*To all whom it may concern:*

Be it known that I, JOHN MAES, a citizen of the United States, residing at Chicago, in the county of Cook and State of Illinois, have invented certain new and useful Improvements in Perches for Fowls, of which the following, when taken in connection with the drawings accompanying and forming a part hereof, is a full and complete specification sufficient to enable those skilled in the art to which it pertains to understand, make, and use the same.

The object of this invention is to obtain a perch particularly adapted for use by domestic fowls and by birds held as house pets, by the use of which perch poultry and birds will be largely freed from lice.

A further object of this invention is to obtain a perch which will be economical in construction and durable.

In the drawings referred to, Figure 1 is a side elevation of a section of a perch embodying this invention. Fig. 2 is a top plan view of a section of a perch embodying this invention. Fig. 3 is a vertical sectional view of a perch embodying this invention.

A reference-letter applied to designate a given part is used to indicate such part throughout the several figures of the drawings wherever the same appears.

A is the perch, preferably constructed in two parts and made of wood, papier-mâché, or other material not ojectionable for the feet of fowl to come in contact with.

$a$ is one of the parts of the perch A and $a'$ the other part of such perch. Parts $a$ and $a'$ are preferably joined together by being dovetailed longitudinally, as is shown at $a^2 a^2$, Fig. 3, and $a^3$ is the dividing-line (see Figs. 2 and 3) between the parts $a$ and $a'$ of the perch. B is a hole extending longitudinally through the perch A.

The reason for making the perch in two parts, as above described, is so that any length thereof that may be desired may be constructed with the hole B extending longitudinally therethrough.

C, C', $C^2$, $C^3$, and $C^4$ are laterally-extending holes from the sides and upper face of the perch communicating at the inner ends thereof, respectively, with the longitudinally-extending hole B. These laterally-extending holes are of much smaller diameter than is the longitudinally-extending hole in the perch.

For a poultry-house the perch is made of the usual size and of any convenient length, and for birds it is made to fit the cage and of small size and preferably round.

The manner of using this perch is as follows: The perch is supported in the usual way, so as to extend substantially in a horizontal plane with the curved face upward, as is shown in the drawings. When fowls—as, say, chickens—infested with lice roost upon this perch, a large number of lice will when filled with blood from the fowl go onto the perch and finding the holes C C' $C^2$ $C^3$ $C^4$ will enter such holes, and many of such lice will crawl through such holes into the longitudinally-extending hole B. Early in the morning when the fowls have left the perch it should be taken from the hen-house or other place of roosting and at a convenient place brought into a nearly-vertical position and sharply rapped or tapped, when the lice contained in the longitudinally-extending hole B will fall therefrom into a receptacle or into a flame, where they are destroyed.

By use of this perch it will be found that in a short time the fowl will be substantially cleaned of lice, as the habit of the ordinary chicken-louse is to retreat from the fowl after becoming filled with blood and to remain off such fowl until again desiring blood.

When the perch is made of two parts $a a'$, as shown and described, the longitudinally-extending hole B is obtained by making grooves on the faces which come adjacent to each other when such parts are joined together to form the perch. These grooves may be half-round in cross-section, in which case the hole B obtained thereby will be circular in cross-section, as is shown in Fig. 3 of the drawings; but I do not, of course, confine myself to the shape of such groove in cross-section, as such shape is immaterial provided the hole extends the entire length of the perch.

Having thus described my invention, what I claim as new, and desire to secure by Letters Patent, is—

A perch for fowl comprising a two-part rod of suitable material, such parts provided with a longitudinally-extending groove on their respective meeting faces, and with laterally-extending holes communicating at their inner ends with the longitudinally-extending hole obtained by the grooves, and such meeting faces respectively provided with a longitudinally-extending beveled tongue and groove, arranged to interlock and join the two parts of the rod together; substantially as described.

JOHN MAES.

In presence of—
CHARLES TURNER BROWN,
CORA A. ADAMS.